UNITED STATES PATENT OFFICE.

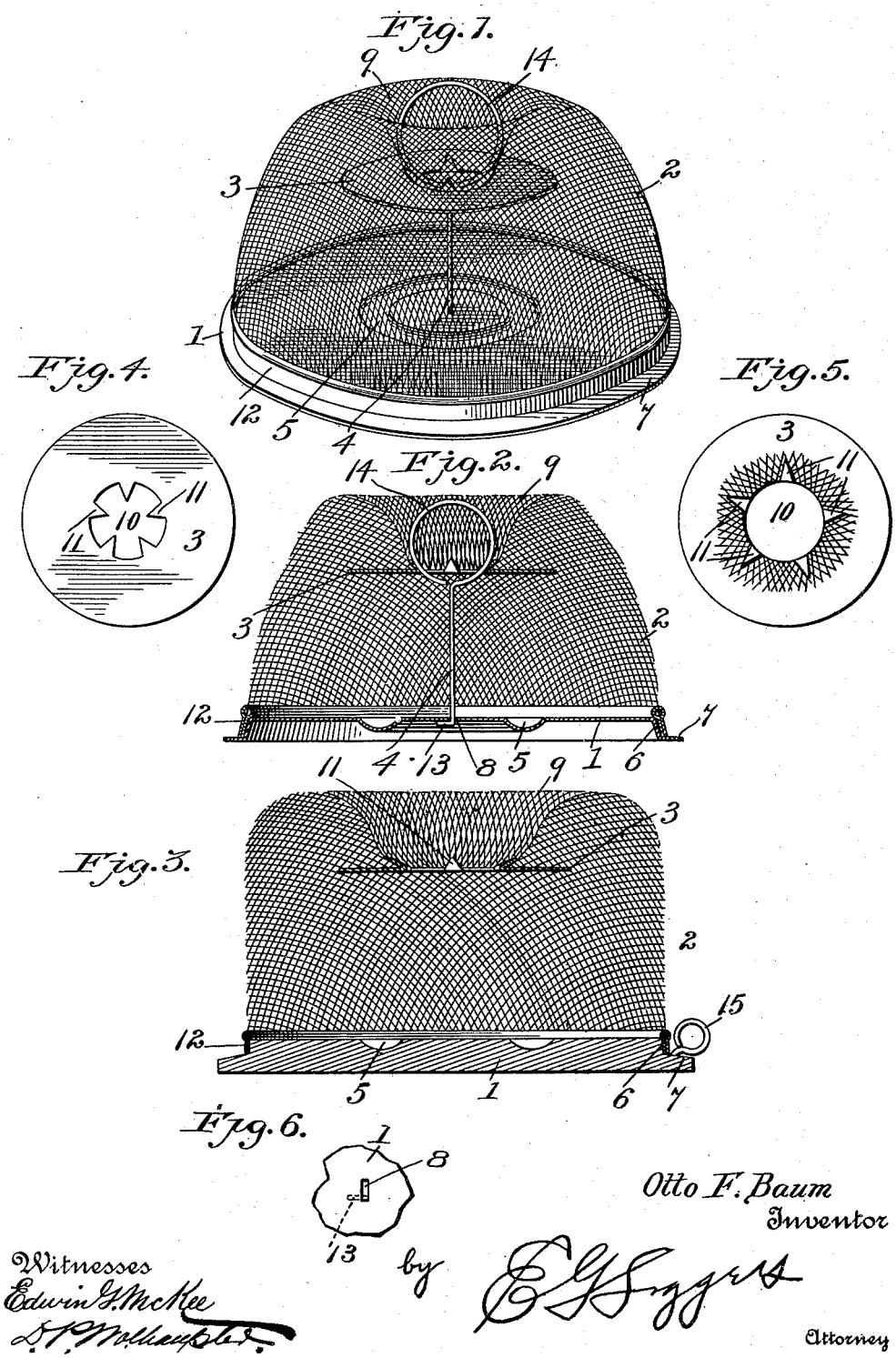

OTTO FERDINAND BAUM, OF MEMPHIS, TENNESSEE.

TRAP.

SPECIFICATION forming part of Letters Patent No. 639,339, dated December 19, 1899.

Application filed June 5, 1899. Serial No. 719,476. (No model.)

*To all whom it may concern:*

Be it known that I, OTTO FERDINAND BAUM, a citizen of the United States, residing at Memphis, in the county of Shelby and State of Tennessee, have invented a new and useful Trap, of which the following is a specification.

This invention relates to traps, and is especially designed for catching roaches, water-bugs, and the like.

The object of the invention is to provide a trap of simple, durable, and efficient construction, the parts of which may be readily assembled and disassociated, the trap requiring no attention except when it becomes necessary to take the same apart for getting rid of the bugs which have accumulated therein or for rebaiting the same.

The trap may be made of any desired size or shape and from any suitable material, it being within the scope of the invention to make the trap either round, square, oval, or any other shape.

The detailed objects and advantages of the invention will appear in the course of the ensuing description.

The invention consists in a trap embodying certain novel features, details of construction, and arrangement of parts, as hereinafter fully described, illustrated in the drawings, and incorporated in the claims.

In the accompanying drawings, Figure 1 is a perspective view of a trap constructed in accordance with the present invention. Fig. 2 is a vertical central section through the same, showing a metallic base. Fig. 3 is a similar view showing a wooden base. Fig. 4 is a detail plan view of the baffle-plate before it is applied to the top or cover. Fig. 5 is a similar view of the baffle-plate, showing the lips or projections thereon bent into engagement with the cover. Fig. 6 is a detail bottom plan view of a portion of the bottom or base.

Similar numerals of reference indicate corresponding parts in the several figures of the drawings.

The trap contemplated in this invention consists of a base 1, a reticulated or meshed wire fabric cover 2, a baffle-plate 3, and a fastening-rod 4. The base 1 may be either of metal or wood, being shown in Fig. 2 as composed of sheet metal and in Fig. 3 as constructed of wood. It is preferred to form the base from a single piece of sheet metal, and said base is preferably circular or disk-shaped, as illustrated in the drawings. The central portion of the base is depressed to form an annular trough or gutter 5, in which the bait is deposited. The outer edge of the base is depressed to form an annular shoulder 6, which is inclined or slightly oblique to facilitate the close fitting of the cover around the base. The extreme edge of the base is extended outward in an approximately horizontal plane to form a projecting annular flange 7, upon which the cover rests. The base is also provided at or near its center with a slot or aperture 8, in which the end of the fastening-rod 4 is engaged. Where the base is formed of wood, it is provided with the same annular depression 5, shoulder 6, and rest 7 as described in connection with the metallic bottom. The metallic bottom, however, forms a lighter, cheaper, and more durable article and for that reason is preferred.

The top or cover 2 is preferably formed of meshed wire fabric. Primarily it is shaped into the form of a seamless cone, and the upper portion or apex thereof is provided with an opening 9 and also depressed or forced downward into substantially the position shown in Figs. 2 and 3. Applied to the depressed upper edge of the cover is the baffle-plate 3, which is preferably in the form of a smooth or polished metal disk. The central portion of this disk is punched out, as shown at 10, so as to leave inwardly-projecting lips 11, and after the plate is properly positioned within the cover and against the pendent top edge thereof the lips or projections 11 are bent upward and then outward, so as to engage the top edge of the cover and confine it between them and the upper surface of the disk, as clearly illustrated in the drawings.

While the method above described is the preferred one for attaching the baffle-plate to the cover, in some instances it may be desirable to solder, rivet, or otherwise secure said parts together. This baffle-plate prevents the roaches and water-bugs from getting out through the opening 9, as it prevents them from obtaining a sufficiently firm foothold on any part of the trap adjacent to the only outlet-opening.

The lower edge of the cover is reinforced by means of a metal band 12, which extends preferably around the outer surface of the cover, being of slightly larger diameter than the base, where the shoulder 6 is located. The top or cover is secured to the base by means of a fastening-rod 4, which is provided at its lower end with a bent extremity or hoop 13, insertible through the slot 8 in the base. The upper end of the rod 4 is formed into a loop or eye 14 of larger diameter than the central opening in the baffle-plate, so that said loop cannot pass therethrough, and also to enable said loop to project sufficiently above the opening 9 to form a finger-hold, whereby the trap may be conveniently lifted or carried, also enabling the fastening-rod to be turned axially for engaging its lower end with or disengaging it from the base.

The cover is connected to the base by passing the bent end of the rod 4 through the opening 9 until the loop 14 rests against the baffle-plate. The fastening-rod is then forced downward until its bent lower extremity passes through the slot 8 in the base, whereupon said rod, by means of the loop 14, is given a quarter or half turn, which causes the bent lower extremity to engage beneath the metallic bottom, thus preventing the upward movement of the fastening-rod and locking the base and cover together. Where a wooden base is employed, the fastening-rod is dispensed with and a finger-hold in the form of a screw-eye 15 is inserted in the base, at one side thereof, as shown in Fig. 3.

The right is hereby reserved to make the trap either round, square, oval, or of any other desired general shape, and any suitable or preferred materials may be employed in the construction or manufacture of the trap.

From the foregoing it is thought that the construction, operation, and many advantages of the herein-described trap will be apparent to those skilled in the art without further description, and it will be understood that changes in the size, shape, proportion, and minor details of construction may be resorted to without departing from the spirit or sacrificing any of the advantages of the invention.

Having thus described the invention, what I claim, and desire to secure by Letters Patent, is—

1. In a trap, the combination with a reticulated top or cover having a central opening, and a depressed portion surrounding said opening, of a baffle-plate attached to the edge of the cover defining said central opening.

2. In a trap, the combination with the top or cover, of a baffle-plate, having an open center with lips or projections ranged around said opening, the central portion of the cover being depressed and provided with an opening, while the lips or projections on the baffle-plate are bent in such manner as to confine the edge of the cover defining said opening between said lips or projections and the body of the baffle-plate.

3. In a trap, the combination with the top or cover having its upper portion depressed and provided with an opening, of a baffle-plate having a central opening which registers with the opening in the cover, and also provided with inwardly-extending lips or projections which are bent back in such manner as to clamp the edge of the cover against the baffle-plate.

4. In a trap, a sheet-metal base having its outer edge depressed to form an inclined shoulder and then extended to form a substantially horizontal flange, in combination with a detachable cover formed of meshed wire fabric, a reinforcing-band applied to the lower edge thereof and adapted to fit around the inclined shoulder of the base and rest upon the horizontal flange thereof, said top or cover having its upper central portion depressed and provided with an opening, a baffle-plate secured to the cover around the edge defining said opening, and a fastening-rod passing through the top and base and having at its opposite ends means for engaging the top and base, substantially as and for the purpose specified.

5. In a trap, the combination with a detachable base and cover having a centrally-depressed top and an opening in the base of the depression, of a fastening device passing through the opening in the cover, said device being provided at its upper end with a loop which seats itself in said depression, and having at its lower end a hook adapted to pass through an opening in the base, and engage with the base.

6. In a trap, the combination with a detachable base and cover, of a removable fastening-rod insertible through an opening in the top of the cover, and having at its upper end a loop of greater diameter than said opening, the lower end of said rod being bent to form an engaging hook adapted to pass through a slot in the base and engage beneath the same.

In testimony that I claim the foregoing as my own I have hereto affixed my signature in the presence of two witnesses.

OTTO FERDINAND BAUM.

Witnesses:
F. J. BAUM,
R. J. LOCKWOOD.